United States Patent

Ottenstein

[15] 3,665,945

[45] May 30, 1972

[54] VALVE CONTROL SYSTEM AND METHOD

[72] Inventor: Sidney Allan Ottenstein, Spring, Tex.

[73] Assignee: M & J Valve Company, Houston, Tex.

[22] Filed: Feb. 2, 1971

[21] Appl. No.: 112,343

[52] U.S. Cl............................137/14, 137/487.5, 235/151.34
[51] Int. Cl..........................................................F16k 31/00
[58] Field of Search.........................137/2, 10, 12, 14, 487.5; 235/151.34

[56] References Cited

UNITED STATES PATENTS

| | | | |
|---|---|---|---|
| 3,454,037 | 7/1969 | Grace | 137/487.5 |
| 3,464,438 | 9/1969 | Maurer | 137/487.5 |
| 3,517,680 | 6/1970 | Richardson | 137/2 |
| 3,596,873 | 8/1971 | Eufusia | 137/487.5 X |

*Primary Examiner*—Harold W. Weakley
*Attorney*—Flehr, Hohbach, Test, Albritton & Herbert

[57] ABSTRACT

An electronic system and method suitable for initiating the functioning of power operators for one or more flow control valves, responsive to controlling input signals. The controlling signals may be derived from or responsive to operating conditions of the system with which the valve is associated, such as a pressure drop in the line with which the valve is associated. The electronic system initiates operation of the valve responsive to such signals and serves to effect operation of the valve in a predetermined manner or according to a predetermined program, e.g., to close the valve when a pressure drop occurs at a rate greater than a predetermined value.

23 Claims, 4 Drawing Figures

Patented May 30, 1972

INVENTOR.

S. A. Ottenstein

Flehr, Hohbach, Test,
Albritton & Herbert
Attorneys

INVENTOR.
S. A. Ottenstein

VALVE CONTROL SYSTEM AND METHOD

BACKGROUND OF THE INVENTION

This invention pertains generally to electronically controlled systems and methods and more particularly to an electronic system and method for controlling the operation of a pipeline or other flow control valve.

There are many instances where it is desired to effect automatic or semi-automatic control of valves. The desired control may be for the purpose of closing or opening a valve under certain conditions or to provide a predetermined programmed operation responsive to an automatically generated or manually initiated signal. For example, in the pipeline systems such as are used to convey natural gases or other petroleum products, it has been found desirable to provide means for the automatic closing of one or more line valves in the event there is a rapid drop in pressure due to a break in the line.

Heretofore, mechanical systems have been provided for shutting off flow in response to a break in the pipeline. In such systems, the pressure in the pipeline is continuously monitored and compared with the pressure in a reference tank which communicates with the interior of the pipeline through a small orifice. The orifice may be provided with a one-way valve so that on rising pressures in the pipeline, gas flows through the orifice and valve into the reference tank. On falling pressures in the pipeline, gas flows out of the reference tank, closing the valve and establishing a pressure drop across the valve and orifice. In such a system, the pressure across the orifice is commonly measured by means of a device having a piston in a cylinder communicating with the two sides of the orifice so that the position of the piston within the cylinder is determined by the pressure differential across the orifice. Suitable means including an electrical switch serve to detect the position of the piston, and an electrical circuit controlled by the switch causes a power operator for the valve to be energized. The power operator may be anyone of several known types, e.g., electrical, pneumatic or hydraulic.

Certain difficulties have been experienced with valve control systems utilizing orifice type pressure drop sensing devices. For example, the expansion of a gas discharging from an orifice has a natural cooling effect which can freeze components of the gas and thus block the orifice. This problem is particularly severe with products such as carbon dioxide, but it also exists with natural gas. A problem also exists because temperature variations between the reference tank and pipeline produces pressure differences which can cause serious inaccuracies in the operation of the system. Furthermore, being mechanically operated, such systems are subject to a certain amount of inherent friction which produces additional inaccuracies. Also, such systems are not adaptable to a wide variation in line pressures.

There is, therefore, a need for a new and improved valve control system and method which overcomes the foregoing and other difficulties encountered with the systems heretofore provided.

SUMMARY AND OBJECTS OF THE INVENTION

The present invention provides an electronic control system and method which are particularly suitable for controlling the operation of valves. The system includes means for monitoring an analog input signal and delivering an output control signal when the input signal changes at a rate greater than a predetermined rate. The input signal may be derived from or responsive to operating conditions, such as pressure, in a system such as a pipeline.

It is in general an object of the present invention to provide a new and improved system and method for controlling the operation of valves.

Another object of the invention is to provide a system and method of the above character which is completely electronic and which can be employed to initiate control of a valve responsive to certain conditions or to effect valve operation in a predetermined or programmed manner.

Another object is to provide a system and method of the above character which can be employed to effect automatic closing of a line valve in the event that there is a rapid drop in line pressure due, for example, to a break in the line.

Another object of the invention is to provide a controlled system and method of the above character in which the pressure can be checked a plurality of times before the line valve is finally closed.

Another object of the invention is to provide a system of the above character which can be constructed in a small unit utilizing solid state components.

Additional objects and features of the invention will be apparent from the following description in which the preferred embodiments are set forth in detail in conjunction with the accompanying drawings.

DESCRIPTION OF THE PREFERRED EMBODIMENTS

In one embodiment of the present invention, an electrical signal is generated with a magnitude corresponding to the instantaneous pressure within a pipeline. A reference signal, having a magnitude corresponding to the average pressure in the pipeline, is derived from the pressure signal and stored in the form of a voltage on a capacitor. When the magnitude of the pressure signal is greater than the magnitude of the reference signal, the charge on the capacitor is increased to a level corresponding to the pressure signal. When the magnitude of the pressure signal falls below that of the stored reference signal, a ramp generator is turned on. This generator produces a ramp signal which increases from an initial level of zero at a rate corresponding to the maximum safe rate of pressure drop in the pipeline. The ramp signal is combined with the pressure signal, and the combined signal is compared with the reference signal. When the pressure is dropping at a rate less than or equal to the maximum safe rate, the combined signal will have a magnitude at least as large as the reference signal, and the ramp generator will be turned off. When the pressure drops at a rate faster than the safe rate, the magnitude of the combined signal is less than the magnitude of the reference signal, and the ramp generator remains on. When the ramp signal reaches the predetermined level, a relay is actuated to provide an output signal for operating a pipeline valve. Depending upon the manner in which the valve is connected in the pipeline, it can be either opened or closed to interrupt the passage of fluid to the area in which the drop in pressure is detected. When it is desired to check the pipeline pressure periodically in order to avoid shutting the system down in response to a temporary pressure drop, a second control signal is provided for resetting the valve to its initial condition and resetting the ramp generator and memory capacitor a predetermined time after the first output control signal is delivered. This process can be repeated to provide the desired number of pressure checks.

Figure 1:
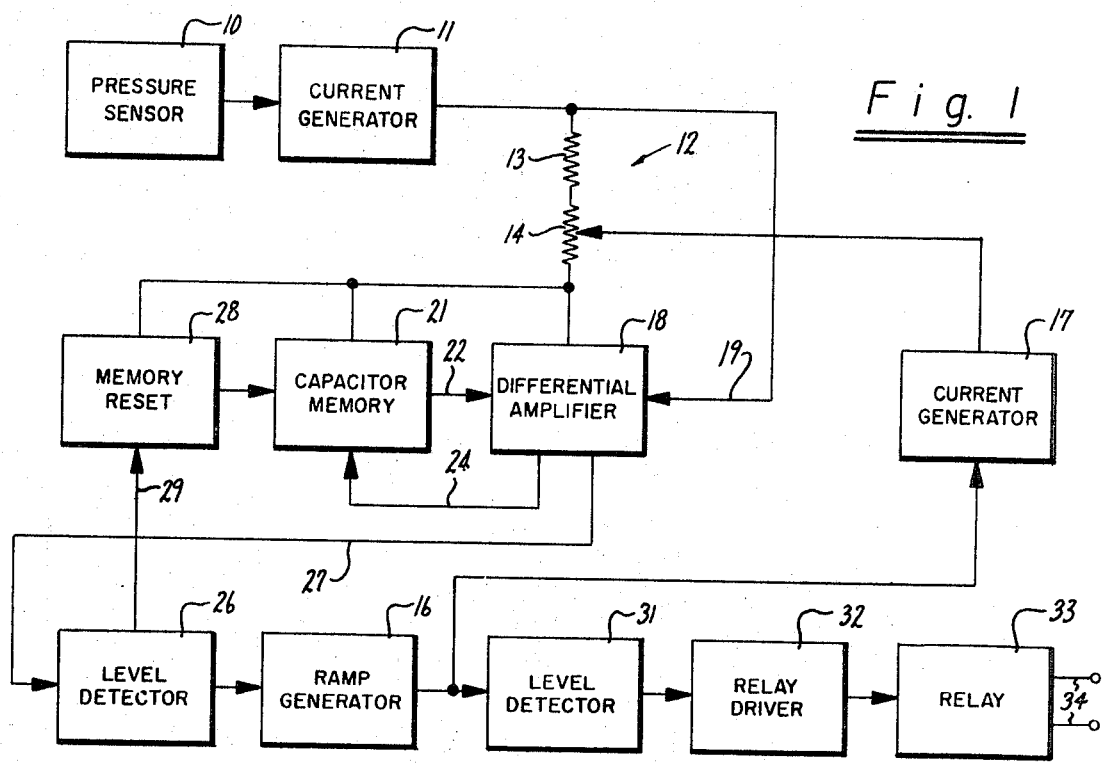
FIG. 1 is a block diagram of one embodiment of a valve control system incorporating the present invention.

The embodiment illustrated in FIG. 1 includes a pressure sensor 10 for monitoring the pressure in the pipeline. In the preferred embodiment, this sensor comprises a pressure sensitive resistive element in fluid communication with the pipeline. A current generator 11 produces a current of constant magnitude which is passed through the resistive element of the pressure sensor to provide a pressure signal having a voltage corresponding to the instantaneous pressure in the pipeline.

The pressure signal is applied to one input of a summation network 12 which in the preferred embodiment consists of a fixed resistor 13 and a variable resistor 14. The summation network also receives a second input signal from a ramp generator 16 and a current generator 17. These generators provide a voltage ramp across the summation network which increases linearly from an initial level of zero. The amp signal is applied to the summation network through a variable contact on the resistor 14, and the rate at which the ramp increases can be adjusted by the setting of this resistor. This rate is usually adjusted to correspond to the maximum rate of pressure drop which can be safely tolerated in the pipeline, and generally is less than that associated with a break in the line. If desired, the variable resistor 14 can be replaced with a plurality of fixed resistors connected in series, with the ramp signal being applied to a tap between two of the resistors to provide the rate desired.

The output of the summation network is applied to one input of a differential amplifier 18 through a circuit designated by the reference numeral 19 in FIG. 1. The differential amplifier also receives a second input from a memory stage 21 through a circuit 22.

In the preferred embodiment, the memory stage 21 includes a capacitor 23 which is connected to the differential amplifier through a circuit 24 in such manner that the charge on the capacitor is increased whenever the signal from the summation network exceeds the signal from the storage memory. Thus, the capacitor is charged to provide a reference signal having a magnitude corresponding to the average or normal pressure in the pipeline, and the charge on the capacitor remains at this reference level even though the pressure signal decreases in magnitude.

The output of the differential amplifier 18 is monitored by a level detector 26 through a circuit 27. In the preferred embodiment, this level detector includes a Schmitt trigger which fires when the magnitude of the signal from the summation network falls below that of the reference signal stored in the capacitor. The level detector 26 controls the operation of the ramp generator 16 in such manner that the ramp generator is turned on by the firing of the level detector. The level detector also initiates the operation of a memory reset stage 28 through a circuit 29 to reduce the charge on the memory capacitor. This resetting occurs as the level detector "unfires" or returns to its initial state, and it provides a convenient means for removing additional charge which builds up on the capacitor due to the ramp signal from the summation network is greater than the stored reference signal. While the differential amplifier provides means for charging the capacitor when the summation signal exceeds the reference signal, it does not discharge the capacitor. Hence, the separate memory reset stage is provided.

The output of the ramp generator 16 is monitored by a second level detector 31. This level detector is of conventional design and is adapted for firing when the ramp signal reaches a level corresponding to the time at which it is desired to operate the valve to interrupt the passage of fluid to the area in which the sensor 10 is located. As illustrated in FIG. 1, the output of the level detector 31 is applied to a conventional relay driver 32 which controls the operation of a relay 33. In the preferred embodiment, this relay is a latching relay having a pair of terminals 34, 34 which are connected electrically together when the relay is energized. These terminals can be connected to the valve operating mechanism for opening or closing the valve, as desired.

Operation of the system shown in FIG. 1 is as follows. Let it be assumed that the pressure sensor 10 (i.e., pressure transducer) has been exposed to the pressure in a pipeline on the downstream side of a valve and that the terminals 34, 34 of the relay 33 have been connected to the operating mechanism of the valve in such manner that the valve will be closed when the relay is energized. As long as the pressure signal remains at least as great as the reference signal stored in the memory capacitor, the level detector 26 holds the ramp generator 16 off, and the output of the summation network consists only of the pressure signal. If the pressure signal exceeds the reference signal, the capacitor will be charged to bring the reference signal up to the level of the pressure signal. If the pressure signal drops below the level of the reference signal, the level detector 26 fires, turning on the generator 16. The output of the ramp generator is combined with the pressure signal in the summation network 12, and the combined signal is compared with the reference signal in the differential amplifier. If the pressure in the pipeline is decreasing at a rate less than or equal to the rate set by the ramp generator, indicating a leak or break in the line, the summation signal will be at least as great as he reference signal. Upon sensing this condition the level detector 26 turns off the ramp generator and causes the memory reset stage 28 to reduce the charge on the memory capacitor. When the pressure is dropping at a rate greater than that set by the ramp generator, the summation signal falls below the reference signal, and the level detector 26 holds the ramp generator 16 on. When the output of the ramp generator reaches the level set by the level detector 31, the latching relay 33 trips, causing the gate valve to close. When the leak or break in the pipeline system has been repaired, the valve control system can be reset manually.

Figure 2:
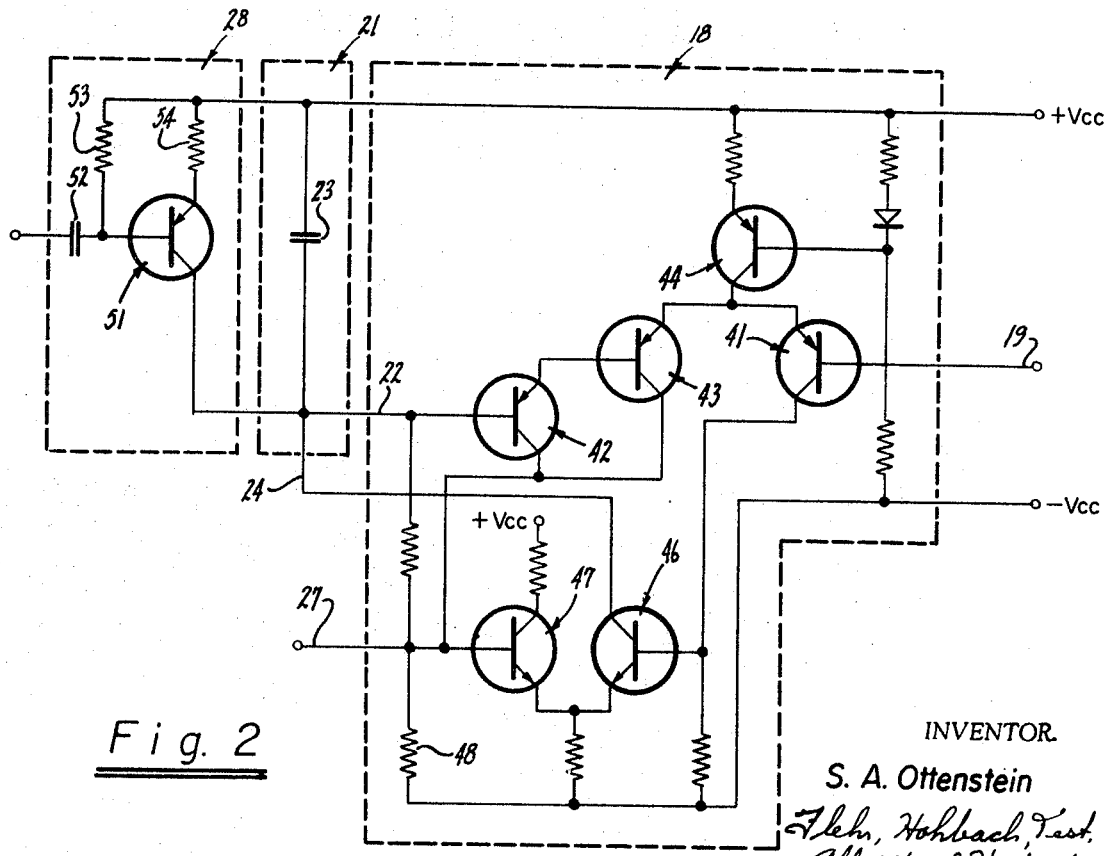
FIG. 2 is a schematic diagram of one embodiment of a differential amplifier, memory stage and memory reset stage which can be used in the valve control system illustrated in FIG. 1.

Presently preferred embodiments of the differential amplifier 18, memory stage 21 and memory reset stage 28 are shown in greater detail in FIG. 2. As discussed above, the differential amplifier receives a first input through a circuit 19 from the summation network and a second input through a circuit 22 from the memory stage. The signal from the summation network is applied to the base of a transistor 41, and the signal from the memory stage is applied to the base of a transistor 42. The transistor 42 and a transistor 43 form a Darlington pair, which imposes a smaller drain on the capacitor than would a single transistor. The transistor 41 and the Darlington pair form a first differential pair which receive operating current from a constant current generator 44. The output of the transistor 41 is applied to the base of a transistor 46, and the output of the Darlington pair is applied to the base of a transistor 47. The transistors 46 and 47 form a second differential pair. The collector of the transistor 46 is connected to the memory capacitor through the circuit 24. When the summation signal exceeds the reference signal, the transistor 46 is turned on, and the memory capacitor is charged through this transistor. When the summation signal is less than the reference signal, the transistor 47 is turned on, developing a voltage across a resistor 48 which is connected between the base of the transistor 47 and the negative terminal of the power supply. This voltage is applied to the input of the level detector 26 through the circuit 27.

The memory stage 21 comprises a capacitor 23 which in the preferred embodiment has a value on the order of 3,400 microfarads.

The memory reset stage 28 includes a transistor 51 and a timing circuit comprising a capacitor 52 and a resistor 53. When the level detector fires, the transistor 51 is turned on, and it remains on for a period of time determined by the values of the capacitor 52 and resistor 53. While the transistor is turned on, the capacitor 23 discharges through the transistor and a resistor 54 connected in the emitter circuit of the transistor. Thus, the capacitor 52 and resistor 53 determine the time for which the memory capacitor is discharged, and the resistor 54 determines the rate of discharge.

Figure 3:
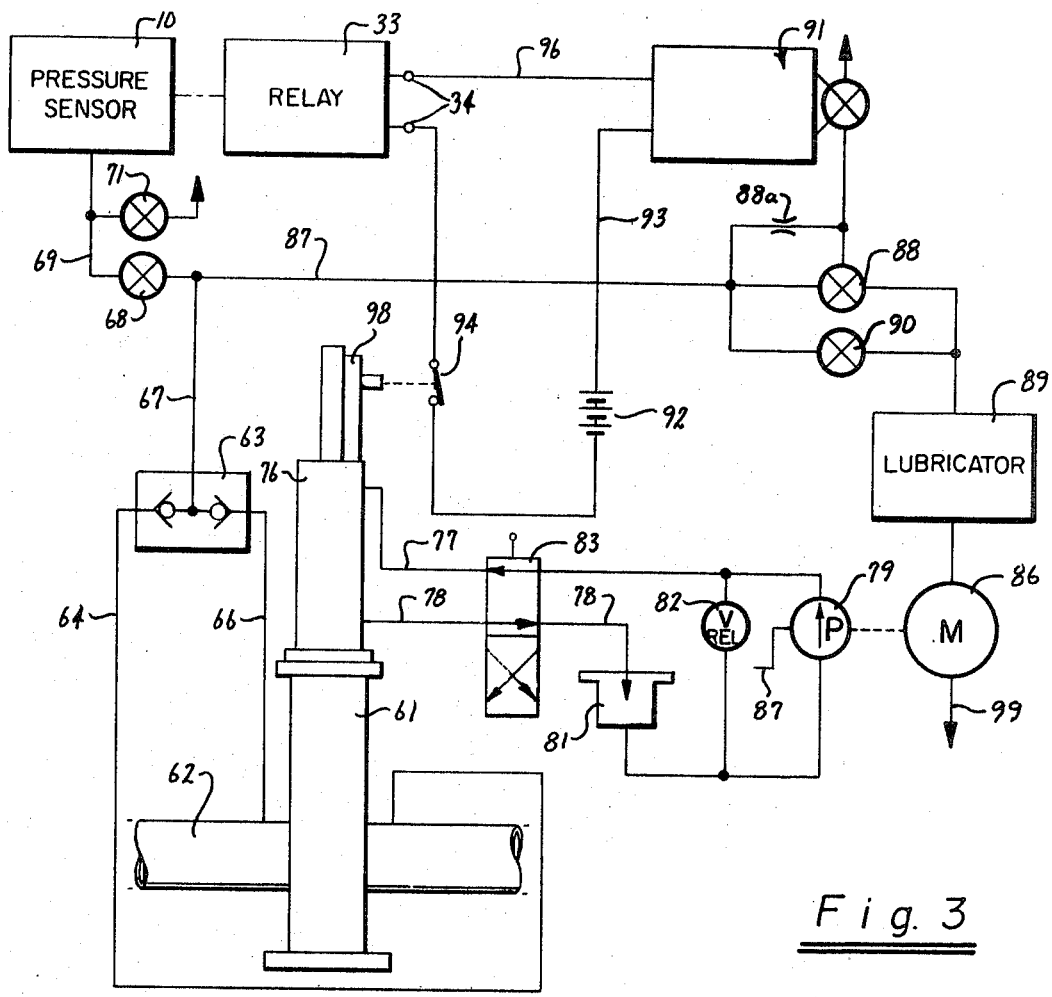
FIG. 3 is a schematic diagram of one embodiment of a valve control system incorporating the electronic system of FIG. 1.

FIG. 3 illustrates the use of the control system of FIG. 1 in connection with one embodiment of a hydraulic system for operating a gate valve. In this system, the gate valve 61 controls the passage of fluid through a pipeline 62. Fluid is taken from the pipeline 62 by means of a shuttle valve 63 and fluid lines 64 and 66. The lines 64 and 66 communicate with the pipeline 62 on opposite sides of the gate valve, and the shuttle valve passes fluid to a line 67 from the side of the gate valve on which the pressure is higher. The line 67 is connected to the pressure sensor 10 through a normally open blocking valve 68 and a fluid line 69. A normally closed vent valve 71 is connected to the line 69 and provides controlled communication between this line and the atmosphere. The valves 68 and 71 provide means for simulating pressure drops in the pipeline for testing the system.

The gate valve 61 is operated by a suitable hydraulic valve operator 76, such as a double-acting hydraulic cylinder and piston assembly with the piston connected to the operating rod of the valve. Fluid is supplied to the operator through hydraulic lines 77 and 78 from a pump 79 and reservoir 81. A relief bypass valve 82 is provided across the pump 79 in the event that the pressure developed by the pump exceeds a predetermined safe limit. A four-way control valve 83 is connected in the lines 77 and 78 to control the direction of flow to the valve operator 76 and, hence, the direction of valve movement when the pump is energized. The four-way valve can be manually operated or, if desired, it can be operated by an electrical solenoid or a pneumatic or hydraulic operator. The pump 79 can be of the positive displacement type, and in the system illustrated, it is driven by a pneumatic or gas motor 86. A crank 87 is shown for operating the pump manually, if desired.

The motor 86 is shown as being driven by gas taken from the pipeline 62. The gas passes to the motor from the line 67 through a line 87, a valve 88 and a lubricator and filter 89. Operation of the valve 88 is controlled by a solenoid operated pilot valve 91. The valve 88 may be of the poppet type with a piston like valve member and seat assembly which controls the passage of fluid through the valve. One end of the piston engages the seat to close the valve, and a closed chamber is provided at the other end of the piston for receiving fluid to urge the piston against the seat. The line 87 communicates with both sides of the poppet valve piston, with the gas passing from the line of the chamber passing through a restrictive orifice 88a. The portion of the piston which is exposed to the chamber has a larger area than the portion exposed to the seat, and the fluid from the line 87 holds the poppet valve in a normally closed position. The solenoid operated valve 91 provides means for venting the piston chamber to the atmosphere to open the valve. A bypass valve 90 may be connected in parallel with the poppet valve to provide means for manually supplying gas to the motor 86, if desired.

The solenoid operated valve 91 is controlled by the relay 33 of the control system shown in FIG. 1. Power for energizing the solenoid is obtained from a battery or other source 92. One terminal of this battery is connected directly to one terminal of the solenoid through a circuit 93, and the other terminal is connected to one of the relay terminals 34 through a limit switch 94. The other relay terminal 34 is connected to the other solenoid terminal through a circuit 96. The limit switch 94 is mounted on the valve operator 96, as indicated at 98. This switch is normally closed and is adapted for opening when the gate valve 61 reaches its fully closed position.

Operation and use of the valve operating system of FIG. 3 can now be described briefly. Let it be assumed that the gate valve is in its open position, as illustrated in FIG. 3. When the relay 33 is energized the solenoid valve 91 closes, venting the chamber in the poppet valve and delivering gas to the motor 86. Gas is exhausted from the motor through an exhaust outlet 99. When energized by the motor 86, the pump 79 delivers fluid to the operator 76 through the four-way valve 83 in such direction that the gate valve is closed. When the gate valve reaches its fully closed position, the limit switch 94 is opened, de-energizing the solenoid valve 91, thereby turning off the motor and pump. The gate valve will remain in its closed position until the four-way valve is moved to its other position and the pump 79 is again energized.

Figure 4:
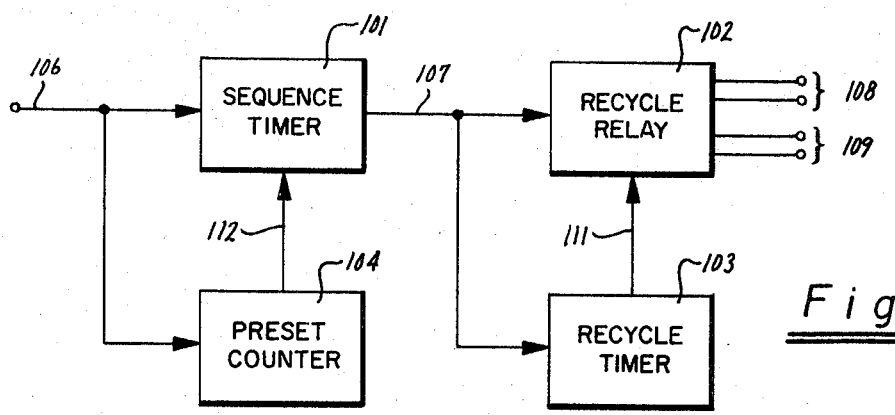
FIG. 4 is a block diagram of one embodiment of a sequencing system which can be incorporated in the control system of FIG. 1 for checking the pressure in the pipeline a predetermined number of times before the flow is finally interrupted.

FIG. 4 illustrates a sequencing system which can be incorporated in the valve control system of FIG. 1 to check the pressure in the pipeline a desired number of times before the passage of fluid is permanently interrupted. The sequencing system includes a sequence timer 101, a recycle relay 102, a recycle timer 103, and a preset counter 104. The timers 101 and 102 both include conventional timing circuits which deliver an output signal a predetermined time after receiving an input signal. The sequence timer 101 is connected for receiving an input signal corresponding to the energization of the relay 33. This input signal can be taken from either the level detector 31, the relay driver 32 or the relay 33, and it is applied to the sequence timer through a circuit 106. The output of the sequence timer is applied to the input of the recycle relay 102 through a circuit 107. This relay includes two sets of normally open contacts, designated by the reference numerals 108 and 109, which are closed in response to the signal from the sequence timer. The contacts 108 are connected to the valve operating mechanism in such a manner that the position of the valve is changed when the contacts close. Thus, for example, if the valve has been closed by the relay 33, it will be reopened by the closing of the contacts 108. The contacts 109 are connected to the level detector 26 or to the ramp generator 16 and memory stage 28 in such manner that the ramp generator and memory stage are both reset to their initial conditions by the closing of the contacts.

The recycle timer 103 determines the length of time for which the relay contacts 108 and 109 remain closed. The input of this timer is connected to the output of the sequence timer 101, and the output of the timer 103 is connected to the recycle relay through a circuit 111 in such a manner that the relay is deenergized by the output signal from this timer.

The preset counter 104 provides means for determining the number of times the pipeline pressure is checked before the passage of fluid is permanently interrupted. This counter includes a conventional counter connected to the circuit 106 for counting the number of times the relay 33 is energized. The counter also includes means for delivering an output signal when a predetermined number of counts has been reached. This number is chosen to correspond to the number of times the pressure is to be checked and can be adjusted as desired. The output of the counter 104 is applied to the sequence timer 101 through a circuit 112 to inhibit further operation of the timer.

Operation and use of the sequencing system shown in FIG. 4 can be described briefly. Let it be assumed that the circuit 106 has been connected to the level detector 31, that the recycle relay contacts 108 have been connected to the valve operating mechanism in such manner that the valve is reopened when the contacts are closed, and that the relay contacts 109 have been connected to the level detector 26. Each time the relay 33 is energized, a signal is applied to the sequence timer 101 and preset counter 104 through the circuit 106. After the period of time determined by the sequence timer, the recycle relay 102 is energized closing the contacts 108 and 109. This causes the valve to reopen, and it resets the ramp generator 16 and memory stage 28 to their initial states. After a period of time determined by the recycle timer 103, the contacts 108 and 109 reopen. The pressure in the system is then checked again in the manner described in connection with the description of the operation of the system shown in FIG. 1. Each time the relay 33 is energized, the counter 104 advances one count until the preset number of counts is reached. At this time, the inhibit signal is applied to the sequence timer, and thereafter the pipeline valve will remain closed until it is reopened manually. By rechecking the pressure in the pipeline several times before the flow is permanently interrupted, unnecessary shutdowns due to temporary pressure drops which might otherwise be confused with leaks and/or breaks in the line can be avoided.

The control system of the present invention can be constructed with solid state components and powered by a small batter, including the pressure sensor battery and the electronic circuits can be enclosed in a small explosion-proof housing which is readily mounted directly on the valve or valve operator with which it is utilized.

Thus far, the system and method of the present invention have been described with specific reference to the operation of a valve in response to a pressure drop at a rate corresponding to a break in a pipeline. It is to be understood, however, that the system and method can be utilized to provide an output control signal in response to any analog rate signal or any rate signal that can be converted to an analog signal. For example, if the pressure sensor 10 is replaced by a temperature sensor, the system will produce an output control signal in response to a temperature change at a rate greater than the rate established by the slope of the ramp signal. Other rates which can be monitored by the invention include flow rate, speed and velocity.

The output control signals produced by the invention are particularly suitable for controlling the operation of a pipeline valve having a hydraulic operating system of the type shown in FIG. 3 and described above. These signals can also be used to control other types of valve operating systems, such as pneumatic and electrical systems. Likewise, the output signals can be used for controlling devices and systems other than valves. For example, they can be utilized to initiate the operation of an alarm system or a switching system when the input signal changes at a rate greater than the rate determined by the ramp signal.

It is apparent from the foregoing that a new and improved control system and method have been provided. This system and method can be used to monitor almost any analog rate signal and produce output control signals when the rate signal changes in a predetermined manner. The invention is particularly suitable for causing the operation of a valve in response to a pressure drop corresponding to a break in a pipeline. While only the presently preferred embodiments have been described, as will be apparent to those familiar with the art, certain changes and modifications can be made without departing from the scope of the invention as defined by the following claims.

I claim:

1. In a method for applying a control signal to a valve controlling the flow of fluid in a pipeline for operating the valve in response to a pressure drop of predetermined character within the pipeline, the steps of generating an electrical pressure signal having a magnitude corresponding to the instantaneous pressure within the pipeline, generating an electrical reference signal having a magnitude corresponding to the average pressure within the pipeline, comparing the magnitudes of the pressure and reference signals, generating a ramp signal having a magnitude increasing at a predetermined rate when the magnitude of the pressure signal is less than the magnitude of the reference signal, combining the pressure and ramp signals to produce a composite signal, comparing the magnitudes of the composite and reference signals, and delivering a control signal for operating the pipeline valve when the magnitude of the composite signal is less than the magnitude of the reference signal for a predetermined time.

2. A method as in claim 1 together with the additional steps of generating a second control signal for resetting the valve a predetermined time after the first named control signal is delivered and thereafter repeating the steps defined by Claim 1 to produce an additional control signal for again operating the valve when the magnitude of the composite signal is again less than the magnitude of the references signal for the predetermined time.

3. A method as in claim 2 wherein the steps of generating the second control signal and repeating the steps defined by Claim 1 are successively repeated a predetermined number of times.

4. In a system for applying a control signal to a valve in a pipeline for operating the valve in response to a pressured drop of predetermined character within the pipeline, pressure signal generating means for generating an electrical pressure signal having a magnitude corresponding to the instantaneous pressure within the pipeline, means responsive to said pressure signal for generating a reference signal having a magnitude corresponding to the average pressure within the pipeline, ramp generating means for generating a ramp signal having a magnitude increasing at a predetermined rate from an initial level, summation means for combining the pressure and ramp signals to form a composite signal, comparator means for comparing the magnitude of the composite signal with the magnitude of the reference signal, means connected to the comparator means and ramp generating means for resetting the ramp signal to its initial level when the magnitude of the composite signal is at least as great as the magnitude of the reference signal, and means responsive to the ramp signal for producing an output control signal when the magnitude of said ramp signal reaches a predetermined level.

5. A system as in claim 4 wherein said pressure signal generating means includes a pressure sensing element having an electrical resistance corresponding to the pressure in the pipeline and current generating means connected to said element to produce a voltage across said element having a magnitude corresponding to said pressure.

6. A system as in claim 4 wherein said comparator means includes a differential amplifier connected for receiving one input from the summation means and another input from the means for generating the reference signal.

7. A system as in claim 4 wherein the means responsive to the ramp signal includes a level detector and relay means controlled by said level detector.

8. A system as in claim 4 together with means for producing a second control signal for resetting the valve and resetting said ramp signal to its initial level a predetermined time after the output control signal is produced.

9. In a valve control system for use with a pipeline valve having actuating means for opening and closing said valve, pressure signal generating means for monitoring the pressure in the pipeline and generating an electrical pressure signal having a magnitude corresponding to the pressure in the pipeline, memory means for storing a reference signal having a magnitude corresponding to average pressure in the pipeline, ramp generating means for generating a ramp signal having a magnitude increasing at a predetermined rate from an initial level of zero, summation means connected for receiving the pressure and ramp signals and combining said signals to form a composite signal having a magnitude corresponding to the sum of the magnitudes of the pressure and ramp signals, differential amplifier means connected for receiving inputs from the memory means and summation means and producing an output signal corresponding to the difference in magnitude between the reference and composite signals, first level detector means connected to the differential amplifier means and ramp generating means for initiating the generation of the ramp signal when the output of the differential amplifier means reaches a predetermined level and resetting the ramp signal to its initial level when the output of the differential amplifier means is below said predetermined level, and second level detector means connected to said ramp generating means for producing an output control signal for actuating the valve actuating means to operate the valve when said ramp signal reaches a predetermined level.

10. A valve control system as in claim 9 wherein said memory means includes a capacitor connected to said differential amplifier means in such manner that said capacitor is charged in response to an increase in the magnitude of said pressure signal and remains charged even though said signal thereafter decreases in magnitude, together with means connected to the capacitor and first level detector means for at least partially discharging said capacitor when the ramp signal is reset to its initial level.

11. A valve control system as in claim 9 further including relay means connected to said second level detector means for applying the output control signal to the valve actuating means.

12. A valve control system as in claim 9 together with sequencing means responsive to the output control signal for producing a second control signal for actuating the valve actuating means to reset the valve a predetermined time after said output control signal is produced, said sequencing means also being connected for resetting the ramp signal to its initial level at said predetermined time.

13. A valve control system as in claim 12 wherein said sequencing means includes means for producing the second control signal and resetting the ramp signal each time the output control signal is produced for a predetermined number of times.

14. In a control system for producing an output control signal when an analog input signal changes in a predetermined manner, means responsive to the input signal for generating a reference signal having a magnitude corresponding to the average magnitude of the input signal, ramp generating means for generating a ramp signal having a magnitude increasing at a predetermined rate from an initial level, summation means for combining the input and ramp signals to form a composite signal, comparator means for comparing the magnitude of the composite signal with the magnitude of the reference signal, means connected to the comparator means and ramp generating means for maintaining the ramp signal at its initial level when the magnitude of the composite signal is at least as great as the magnitude of the reference signal, and means responsive to the ramp signal for producing an output control signal when the magnitude of the ramp signal reaches a predetermined level.

15. A control system as in claim 14 wherein the comparator means includes a differential amplifier connected for receiving one input from the summation means and another input from the means for generating the reference signal.

16. A control system as in claim 15 wherein the means responsive to the ramp signal includes a level detector and relay means controlled by said level detector.

17. A control system as in claim 15 wherein the means for generating the reference signal includes a capacitor connected for charging when the magnitude of the input signal increases.

18. A control system as in claim 15 together with means responsive to the output control signal for producing a second control signal and resetting the ramp signal to its initial level a predetermined time after said output control signal is produced.

19. A control system as in claim 18 wherein the last named means includes means for producing the second control signal and resetting the ramp signal a predetermined number of times.

20. In a method for producing an output control signal when an analog input signal changes at a rate greater than a predetermined rate, the steps of generating a reference signal having a magnitude corresponding to the average magnitude of the input signal, comparing the magnitudes of the input and reference signals, generating a ramp signal which increases from an initial level at the predetermined rate when the magnitude of the input signal is less than the magnitude of the reference signal, combining the input and ramp signals to form a composite signal having a magnitude less than the magnitude of the reference signal when the magnitude of the input signal is decreasing at a rate greater than the predetermined rate, comparing the magnitudes of the composite and reference signals, and producing an output control signal when the magnitude of the composite signal is less than the magnitude of the reference signal.

21. A method as in claim 20 wherein the level of the ramp signal is monitored and the output control signal is produced when the ramp signal reaches a predetermined level.

22. A method as in claim 20 together with the additional steps of generating a second control signal a predetermined time after the output control signal is produced and thereafter repeating the steps defined by claim 20 to produce an additional output control signal if the magnitude of the composite signal is still less than the magnitude of the reference signal.

23. A method as in claim 22 wherein the steps of generating the second control signal and repeating the steps defined by claim 20 are successively repeated a predetermined number of times.

* * * * *